US009542934B2

(12) United States Patent
Cooper et al.

(10) Patent No.: US 9,542,934 B2
(45) Date of Patent: Jan. 10, 2017

(54) SYSTEMS AND METHODS FOR USING LATENT VARIABLE MODELING FOR MULTI-MODAL VIDEO INDEXING

(71) Applicant: FUJI XEROX CO., LTD., Tokyo (JP)

(72) Inventors: Matthew L. Cooper, San Francisco, CA (US); Dhiraj Joshi, Fremont, CA (US); Huizhong Chen, Stanford, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 111 days.

(21) Appl. No.: 14/192,861

(22) Filed: Feb. 27, 2014

(65) Prior Publication Data

US 2015/0243276 A1 Aug. 27, 2015

(51) Int. Cl.
| | |
|---|---|
| *G10L 15/05* | (2013.01) |
| *G06F 17/30* | (2006.01) |
| *G11B 27/00* | (2006.01) |
| *G06K 9/32* | (2006.01) |
| *H04N 21/2343* | (2011.01) |
| *H04N 21/4402* | (2011.01) |
| *G06K 9/00* | (2006.01) |
| *H04N 7/088* | (2006.01) |
| *G06N 7/00* | (2006.01) |

(52) U.S. Cl.
CPC ......... *G10L 15/05* (2013.01); *G06F 17/30787* (2013.01); *G06K 9/3266* (2013.01); *G11B 27/00* (2013.01); *H04N 21/234336* (2013.01); *H04N 21/440236* (2013.01); *G06K 9/00711* (2013.01); *G06N 7/005* (2013.01); *H04N 7/0882* (2013.01)

(58) Field of Classification Search
CPC ..................... G06K 9/00711; G06F 17/30787; G06F 9/3266; H04N 21/234336; H04N 21/44036; H04N 7/0882; G10L 15/05; G06N 7/005; G11B 27/005
USPC .......................... 704/231, 235, 251, 255, 257
See application file for complete search history.

(56) References Cited

U.S. PATENT DOCUMENTS

| | | | |
|---|---|---|---|
| 2007/0061146 A1* | 3/2007 | Jaramillo .......... | G06F 17/30864 704/270 |
| 2007/0233487 A1* | 10/2007 | Cohen et al. .................. | 704/255 |
| 2012/0078626 A1* | 3/2012 | Tsai et al. ..................... | 704/235 |

OTHER PUBLICATIONS

John Adcock et al. Ialkminer: a lecture webcast search engine. In Proceedings of the international conference on Multimedia, MM '10, pp. 241-250, New York, NY, USA, 2010. ACM.
Kobus Barnard et al. Matching words and pictures. J. Mach. Learn. Res., 3:1107-1135, Mar. 2003.

(Continued)

*Primary Examiner* — Thierry L Pham
(74) *Attorney, Agent, or Firm* — TransPacific Law Group; Pavel I. Pogodin, Esq.

(57) ABSTRACT

A computer-implemented method performed in connection with a computerized system incorporating a processing unit and a memory, the computer-implemented method involving: using the processing unit to generate a multi-modal language model for co-occurrence of spoken words and displayed text in the plurality of videos; selecting at least a portion of a first video; extracting a plurality of spoken words from the selected portion of the first video; extracting a first displayed text from the selected portion of the first video; and using the processing unit and the generated multi-modal language model to rank the extracted plurality of spoken words based on probability of occurrence conditioned on the extracted first displayed text.

19 Claims, 5 Drawing Sheets

(56) References Cited

OTHER PUBLICATIONS

Michael W.Berry,Susan T.Dumais, and Gavin W. O'Brien. Using linear algebra for intelligent information retrieval. SIAM review, 37(4):573-595, 1995.
David M. Blei, Andrew Y. Ng, and Michael I. Jordan. Latent dirichlet allocation. J. Mach. Learn. Res., 3:993-1022, Mar. 2003.
Berlin Chen. Word topic models for spoken document retrieval and transcription. ACM Transactions on Asian Language Information Processing, 8(1):2:1-2:27, Mar. 2009.
Jason Chuang et al. Without the clutter of unimportant words: Descriptive keyphrases for text visualization. ACM Trans. Comput.-Hum. Interact., 19(3):19:1-19:29, Oct. 2012.
Matthew Cooper. Presentation video retrieval using automatically recovered slide and spoken text. In Proc. SPIE, vol. 8667, 2013.
Thomas Hofmann. Unsupervised learning by probabilistic latent semantic analysis. Mach. Learn., 42(1/2):177-196, Jan. 2001.
J. Jeon et al. Automatic image annotation and retrieval using cross-media relevance models. SIGIR '03, pp. 119-126, New York, NY, USA, 2003. ACM.
Rainer Lienhart et al. Multilayer plsa for multimodal image retrieval. In Proc. of ACM Int. Conf. on Image and Video Retr.CIVR '09,pp. 9:1-9:8, New York, NY, USA, 2009. ACM.
Christopher D. Manning, Prabhakar Raghavan, and Hinrich Schutze. Introduction to information retrieval. Cambridge University Press Cambridge, 2008.
Nikhil Rasiwasia et al. A new approach to cross-modal multimedia retrieval. In Proc. of the int. conf. on Multimedia, MM '10, pp. 251-260, New York, NY, USA, 2010. ACM.

\* cited by examiner

$a(x)y'' + b(x)y' + c(x)y = d(x)$
⏟ 2nd order
$Ay'' + By + C = 0$ ⟶ homogeneous
$g(x)$ is a solution
$Ag'' + Bg' + Cg = 0$
$c, g(x)$? $Ac,g'' + Bc,g' + Cc,g$
$c, (Ag'' + Bg' + Cg)$

402

403 +

404

$a(x)y'' + b(x)y' + c(x)y = d(x)$
⏟ 2nd order
$Ay'' + By + C = $
$g(x)$ is a solution
$Ag'' + Bg' + Cg$
$c, g(x)$? $Ac,$
$c, (A$

405

406 → And let's see whether this is equal to 0. We could factor out that c1 is a constant and we get c1 times Ag prime prime plus Bg prime plus Cg. And lo and behold

402

SYSTEMS AND METHODS FOR USING LATENT VARIABLE MODELING FOR MULTI-MODAL VIDEO INDEXING

BACKGROUND OF THE INVENTION

1. Technical Field

The disclosed embodiments relate in general to systems and methods for video content indexing and, more specifically, to computerized systems and computer-implemented methods for enhanced multi-modal lecture video indexing.

2. Description of the Related Art

Recording video is now an everyday activity, as it has become more common to own devices such as video cameras, smartphones and digital cameras. In addition, thanks to a wide range of services and infrastructures available for handling video, we can easily find and watch videos online. However, videos without any metadata, such as date, creator, keywords, or description, cannot be found using typical search engines. Metadata is usually added manually, and the process is very time consuming. Furthermore, even if a video can be found by its metadata, search engines normally are not capable of finding a specific scene of interest within the video.

U.S. Pat. No. 8,280,158 describes a lecture video search engine. This system distinguishes itself from other video search engines by focusing on the lecture video genre and exploiting the videos' structuring according to slides. The described system automatically detects slides appearing in the videos and processes slide frames to extract their text using optical character recognition (OCR). A powerful slide keyframe-based interface allows users to efficiently navigate inside the videos using text-based search.

Another source of text that describes a broader class of video is text extracted from the audio track, typically using automatic speech recognition (ASR). In previous published work Matthew Cooper, Presentation video retrieval using automatically recovered slide and spoken text, In Proc. SPIE, volume 8667, 2013, the characteristics of the text derived from slides and from speech were established and contrasted in controlled experiments with manual ground truth. Spoken text from ASR or closed captions (CC) is typically dense, improvised, and contains generic terms. Errors in ASR occur at the word level due to acoustic mismatch and degrade retrieval performance. Slide text from either the slide file or extracted from slides using an OCR is relatively sparse, but contains discriminative terms as the product of an authoring process. Errors in automatically extracted slide terms occur at the character level and have a negligible impact on retrieval.

Thus, new and improved systems and methods are needed that would integrate text derived from the speech in the audio track and the slides in the video frames for enhanced multi-modal video indexing.

SUMMARY OF THE INVENTION

The embodiments described herein are directed to systems and methods that substantially obviate one or more of the above and other problems associated with the conventional technology for video content indexing.

In accordance with one aspect of the embodiments described herein, there is provided a computer-implemented method performed in connection with a computerized system incorporating a processing unit and a memory, the computer-implemented method involving: using the processing unit to generate a multi-modal language model for co-occurrence of spoken words in the plurality of videos and an external text associated with the plurality of videos; selecting at least a portion of a first video; extracting a plurality of spoken words from the selected portion of the first video; obtaining a first external text associated with the selected portion of the first video; and using the processing unit and the generated multi-modal language model to rank the extracted plurality of spoken words based on probability of occurrence conditioned on the obtained first external text.

In one or more embodiments, the obtaining the first external text involves extracting the first external text from a text displayed in the selected portion of the first video.

In one or more embodiments, the external text is displayed in at least one of the plurality of videos.

In one or more embodiments, the external text is contained in a content associated with at least one of the plurality of videos.

In one or more embodiments, each of the plurality of videos includes a plurality of presentation slides containing the external text.

In one or more embodiments, generating the multi-modal language model involves extracting all spoken words from all of the plurality of videos and extracting the external text displayed in the plurality of videos and calculating a plurality of probabilities of co-occurrence of each of the extracted spoken words and each of the extracted external text.

In one or more embodiments, the multi-modal language model is stored in a matrix form.

In one or more embodiments, the plurality of spoken words is extracted from the selected portion of the first video using automated speech recognition (ASR).

In one or more embodiments, the plurality of spoken words is extracted from the selected portion of the first video using close captioning (CC) information associated with the first video.

In one or more embodiments, obtaining the first external text associated with the selected portion of the first video involves detecting slides in the selected portion of the first video and extracting the first external text from the detected slides using optical character recognition (OCR).

In one or more embodiments, the method further involves providing the ranked plurality of spoken words to the user; receiving from the user a selection of at least one of the provided plurality of spoken words; and using the received selection of the at least one of the provided plurality of spoken words as an annotation for the first video.

In one or more embodiments, the method further involves using the annotation to index at least some of the plurality of videos.

In one or more embodiments, the method further involves using the ranked extracted plurality of spoken words to index at least some of the plurality of videos.

In one or more embodiments, the method further involves using top ranked words from the ranked extracted plurality of spoken words to index at least some of the plurality of videos.

In one or more embodiments, the extracted plurality of spoken words includes a phrase.

In one or more embodiments, the extracted plurality of spoken words includes a sentence.

In one or more embodiments, the selected portion of the first video includes a contextually meaningful segment of the first video.

In accordance with another aspect of the embodiments described herein, there is provided a non-transitory computer-readable medium embodying a set of computer-executable instructions, which, when executed in connection with a computerized system incorporating a processing unit and a memory, cause the computerized system to perform a method involving: using the processing unit to generate a multi-modal language model for co-occurrence of spoken words in the plurality of videos and an external text associated with the plurality of videos; selecting at least a portion of a first video; extracting a plurality of spoken words from the selected portion of the first video; obtaining a first external text associated with the selected portion of the first video; and using the processing unit and the generated multi-modal language model to rank the extracted plurality of spoken words based on probability of occurrence conditioned on the obtained first external text.

In accordance with yet another aspect of the embodiments described herein, there is provided a computerized system incorporating a processing unit and a memory storing a set of instructions, the set of instructions including instructions for: using the processing unit to generate a multi-modal language model for co-occurrence of spoken words in the plurality of videos and an external text associated with the plurality of videos; selecting at least a portion of a first video; extracting a plurality of spoken words from the selected portion of the first video; obtaining a first external text associated with the selected portion of the first video; and using the processing unit and the generated multi-modal language model to rank the extracted plurality of spoken words based on probability of occurrence conditioned on the obtained first external text.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 4 illustrates an exemplary embodiment of a user interface of an application for generating annotations to a video using the described multi-modal language model.

DETAILED DESCRIPTION

Figure 1:
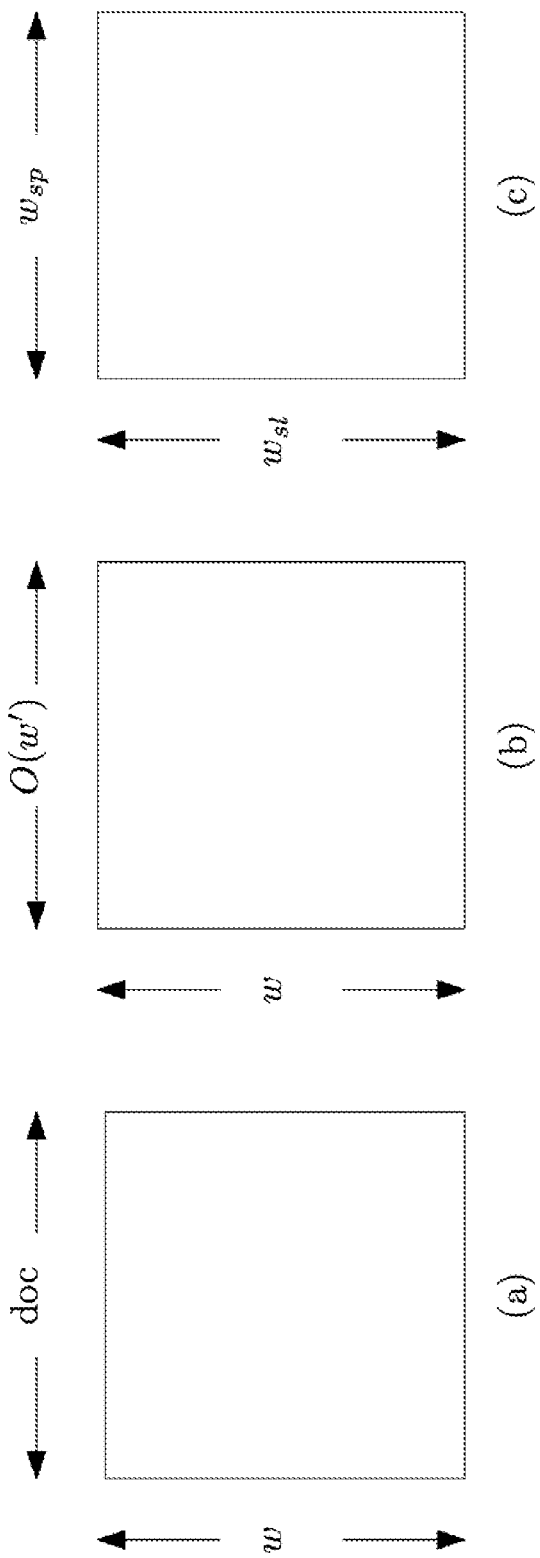
FIG. 1 illustrates: the traditional word-document matrix (panel (a)) that is modeled using PLSA and LDA; the matrix processed in word-topic modeling (panel (b)); and the multi-modal modification in which an observation function O is used in place of documents (panel (c)).

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there are provided computerized systems and computer-implemented methods for integrating text derived from the speech in the audio track and the slides in the video frames of a video lecture presentation for enhanced multi-modal lecture video indexing. In one or more embodiments, the established latent variable modeling approaches for text document indexing are adopted to model the co-occurrence of words in the presenter's slides and speech. In one embodiment, the aforesaid multi-modal approach is applied to lecture video retrieval.

1. Latent Variable Models

In one or more embodiments described herein, an external information source is combined with the available spoken text (either CC or ASR transcripts). The role of the external source is to inform which spoken terms are more likely to better describe the video content. In other words, the goal is to diminish the negative impact on retrieval of the generic terms that occur in the spoken transcript, while retaining more descriptive terms. The described modeling approach is to analyze the co-occurrence of spoken terms with the terms in the external source. In one or more embodiments, latent variable modeling is used to identify the most important co-occurrences between the words in each modality and can then use the model to rank videos based on the video's associated text and a text query.

In one embodiment, the slide text (either extracted using an OCR from the slides themselves, or derived from the slide presentation file) is utilized as the aforesaid external information source. The result is a model of term co-occurrence in the slides and spoken transcripts. An alternate embodiment can use external text for lectures without slides. In educational settings, this text source could be a text book or readings associated with the recorded lecture. The key constraint on the external text is that there be a mapping (e.g. a syllabus) from the text (e.g. by chapter) to the specific videos within the corpus. In one embodiment, the videos are directly associated with a set of slides and an audio transcript.

1.1 Unimodal Corpus Modeling

The vector space model (VSM) for information retrieval described in detail in Christopher D. Manning, Prabhakar Raghavan, and Hinrich Schulze, Introduction to information retrieval, Cambridge University Press Cambridge, 2008, treats documents as "bags" of text and drives state of the art text search systems such as Lucene, well known to persons of ordinary skill in the art. Representing documents as text vectors leads naturally in turn to viewing a document corpus as a matrix. There is a long history of linear algebraic methods for modeling document corpora. FIG. 1 depicts such a matrix (panel (a)) in which the rows and columns are indexed by the words (w) and documents (doc), respectively.

In one or more embodiments, methods including latent semantic analysis (LSA), described in detail in Michael W. Berry, Susan T. Dumais, and Gavin W. O'Brien, Using linear algebra for intelligent information retrieval, SIAM review, 37(4):573-595, 1995, and probabilistic latent semantic analysis (PLSA) described in Thomas Hofmann, Unsupervised learning by probabilistic latent semantic analysis, Mach. Learn., 42(1/2):177-196, January 2001, are used to process these matrices for text document retrieval. The intuition is that semantic relationships between terms are implied by their co-occurrence within documents. The corpus represents a set of observations of these word co-occurrences. Low rank approximations to these word-document matrices preserve the essential semantic inter-word relationships while discarding spurious co-occurrences. Model training encodes these relationships using a set of latent variables or aspects (therefore two words which never really co-occur in a document may be connected through one or more hidden topics).

The left panel (a) in FIG. 1 shows the traditional word-document matrix that is modeled using PLSA and LDA. The middle panel (b) in FIG. 1 shows the matrix processed in word-topic modeling described in Berlin Chen, Word topic models for spoken document retrieval and transcription, ACM Transactions on Asian Language Information Processing, 8(1):2:1-2:27, March 2009. The right panel (c) in FIG. 1 shows the multi-modal modification in accordance with embodiments described herein in which an observation function O is used in place of documents.

A more localized version of this idea appears in panel (b) of FIG. 1 and was detailed in Berlin Chen, Word topic models for spoken document retrieval and transcription, ACM Transactions on Asian Language Information Processing, 8(1):2:1-2:27, March 2009. Rather than indexing the columns of the matrix by documents as in panel (a), the columns denote the local (sub-document) neighborhoods, O(w) around a word w∈W, the vocabulary. The processing is unchanged, however the semantics here are derived from more local term co-occurrences. Elements of this matrix capture for each word pair the probability $P(w_i, O(w_j))$, and the matrix is square with dimensionality $|W|\times|W|$. Associate with each word a model $M_w$ based on the corresponding column of this matrix, analogous to the documents in panel (a). PLSA produces the conditional probability:

$$P_{WTM}(w_i \mid M_{w_j}) = \sum_z P(w_i \mid z)P(z \mid M_{w_j}). \qquad (1)$$

In Berlin Chen, Word topic models for spoken document retrieval and transcription, ACM Transactions on Asian Language Information Processing, 8(1):2:1-2:27, March 2009, the authors show improved results for language modeling and spoken document retrieval using this approach.

1.2 Multi-Modal Modeling 1.2.1 Related Work

Researchers have attempted to naturally extend the idea of topic modeling to multi-modal domains as well. Images and corresponding annotations have been modeled using variants of PLSA and Latent Dirichlet Allocation (LDA) such as multi-modal LDA described in Kobus Barnard, Pinar Duygulu, David Forsyth, Nando de Freitas, David M. Blei, and Michael I. Jordan, Matching words and pictures, J. Mach. Learn. Res., 3:1107-1135, March 2003, and correspondence LDA described in David M. Blei, Andrew Y. Ng, and Michael I. Jordan, Latent dirichlet allocation, J. Mach. Learn. Res., 3:993-1022, March 2003. In the multi-modal LDA, image region descriptors and annotation words (i.e. tags) are jointly modeled using a common underlying topic distribution. Corr-LDA on the other hand, models a process that first generates region descriptors followed by generation of words (each word linked to one of the regions). In contrast to these methods, in one or more embodiments described herein, a generative model of the corpus is not being created. Rather, a generative model is built for words observed in each modality and their co-occurrences. Because some embodiments use PLSA, rather than LDA, it enables forgoing the complicated variational inference and sampling methods required for model training.

A cross media reference model has been proposed for joint modeling of images and tags in J. Jeon, V. Lavrenko, and R. Manmatha. Automatic image annotation and retrieval using cross-media relevance models. In Proceedings of the 26th annual international ACM SIGIR conference on Research and development in information retrieval, SIGIR '03, pages 119-126, New York, N.Y., USA, 2003, ACM. Contrary to latent variable models, this work jointly models image regions and tags without imposing dependence on any latent variables or assuming a one-to-one correspondence between regions and tags. The joint modeling is simplistic in nature and the authors do not directly compare their technique with a prevalent latent topic based joint modeling approach. In publication Rainer Lienhart, Stefan Romberg, and Eva Horster, Multilayer plsa for multimodal image retrieval. In Proceedings of the ACM International Conference on Image and Video Retrieval, CIVR '09, pages 9:1-9:8, New York, N.Y., USA, 2009, ACM, a multi-layer PLSA approach has been proposed to model visual words and tags. While in essence similar to multi-modal LDA models, the multi-layer modeling introduces two layers of latent variables (one being common between the two modalities) into the joint modeling. The authors mention that contrary to joint multi-modal LDA models, the multi-layer PLSA does not require that tags associated with images necessarily describe the visual content. While some embodiments described herein also use PLSA, unlike the approaches described in both the latter reference and the aforesaid publication by Hofmann, they do not require any complicated folding in procedure for retrieval nor any schemes for initialization for accelerated model training as were used in the aforesaid publication by Lienhart et al. Published work by Nikhil Rasiwasia, Jose Costa Pereira, Emanuele Coviello, Gabriel Doyle, Gert R. G. Lanckriet, Roger Levy, and Nuno Vasconcelos, A new approach to cross-modal multimedia retrieval, In Proceedings of the international conference on Multimedia, MM '10, pages 251-260, New York, N.Y., USA, 2010, ACM, uses canonical correlation analysis (CCA) to model multi-modal data by jointly performing dimension reduction across two modalities (words and pictures). CCA attempts to find mappings of multi-modal data into a joint space wherein correlation between the two modalities is maximized. While the methods described above are designed to model multi-modal information, there are certain points of difference with the described embodiments. CCA attempts to find the subspace wherein the correlation between the modalities is high. On the contrary, one or more embodiments described herein do not optimize correlation but rather explicitly model dependence as conditional probabilities. CCA is suited for a scenario when there is no natural correspondence between representations in different modalities thus needing search of an intermediate subspace.

In accordance with one or more embodiments described herein, there is provided a more direct (and simple) model of the co-occurrence of terms in multiple modalities. Thus, one or more of the described embodiments forego the need to utilize the intermediate subspaces that are employed in the aforesaid publications authored by Lienhart et al. and Rasiwasia et al. Instead, established probabilistic latent variable methods are applied to represent the co-occurrence information across the entire vocabularies of the slide and spoken transcripts of the corpus. This approach provides the flexibility of exploring the probability of generating (query) text in one modality conditioned on the available text associated with a video. At retrieval time, this approach combines the probabilities of query text occurring in either modality conditioned on co-occurrence of the multi-modal data associated with the specific video. This is detailed below.

1.2.2 Modeling Details

Because the word-topic model described in the aforesaid publication by Chen et al. is indexed by words for both the rows and the columns, it extends to multi-modal text data directly. Specifically, consider the model of interest for potentially filtering or weighting spoken words supplied by ASR:

$$p(w_{sp} \mid T_{sl}) = \sum_{w_j \in T_{sl}} \alpha(w_{sl}, T_{sl}) \sum_z P(w_{sp} \mid z) P(z \mid w_{sl}). \quad (2)$$

Here $\alpha$ is a weighting that accounts for the frequency of $w_{sl}$ in $T_{sl}{}^1$. Denote $T_{sl}$ and $T_{sp}$ to be the available slide and spoken text for a video. Because this conditional probability is built from individual slide words $w_{sl} \in T_{sl}$ it can be constructed for unseen slide text so long as the words appear in the training data. An advantage of the model is that documents are represented by their constituent terms, as are queries. This averts the "folding-in" procedure required to use PLSA for document retrieval described in the aforesaid publication by Hofmann.

An issue that thus far has been ignored is how to associate slide and spoken text in the matrix of FIG. 1, panel (c). For unimodal data we used a fixed window. For each slide word, we need to identify a set of spoken words Q that we will process as a quasi-document. There are several possibilities:

1. global co-occurrence: in this case, if a spoken word w and slide word $w_{sl}$ each occur in a specific video's respective slide and spoken transcripts $Q_{w_{sl}} = \{w : w \in T_{sp}(v) \wedge w_{sl} \in T_{sl}(v)\}$ for some video v.

2. fixed window co-occurrence: using video analysis we can associate each slide with specific time segments, and use the timestamps in either CC or ASR. If a slide word and spoken word occur in the video within a fixed time interval we can include the spoken term.

3. segment co-occurrence: this is similar to the above but uses the temporal segmentation derived from the detected slides to partition the spoken text transcript. Slide words and spoken words that occur in the same segment are then associated.

Thus far, experimentally the global co-occurrence approach has performed best. Assuming we have defined the rules to construct the matrix of FIG. 1, panel (c), one can iterate the EM estimation of this model:

E-Step: Update $$p(z_k \mid w_{sp}, w_{sl}) = \frac{p_{sp}(w_{sp} \mid z_k) p(z_k \mid w_{sl})}{\sum_l p_{sp}(w_{sp} \mid z_l) p(z_l \mid w_{sl})} \quad (3)$$

M-Step: Update $$p_{sp}(w_{sp} \mid z_k) = \frac{\sum_{w_{sl}} \#(w_{sl}, w_{sp}) p(z_k \mid w_{sl}, w_{sp})}{\sum_{w_{sp}} \sum_{w_{sl}} \#(w_{sl}, w_{sp}) p(z_k \mid w_{sl}, w_{sp})} \quad (4)$$

$$p(z_k \mid w_{sl}) = \frac{\sum_{w_{sp}} \#(w_{sl}, w_{sp}) p(z_k \mid w_{sl}, w_{sp})}{\#(w_{sl})}. \quad (5)$$

Figure 2:
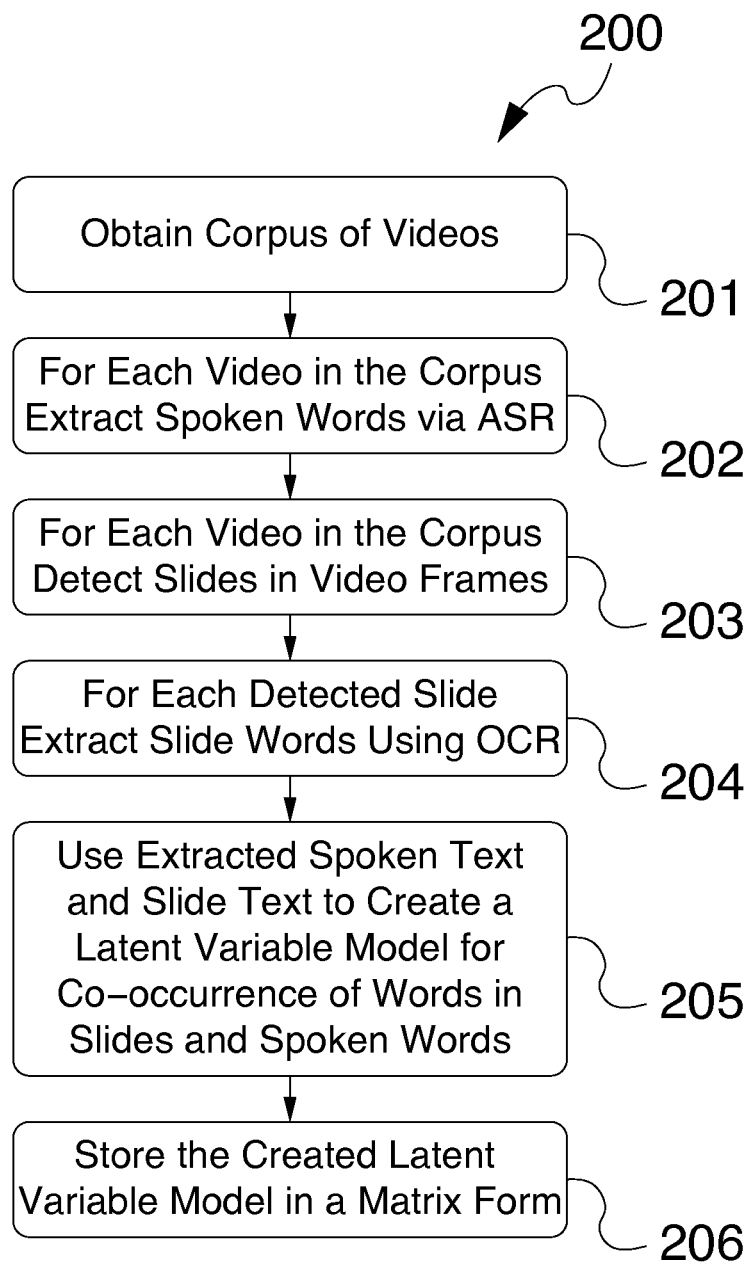
FIG. 2 illustrates an exemplary embodiment of an operating sequence of the latent variable model training process.

FIG. 2 illustrates an exemplary embodiment of an operating sequence 200 of the latent variable model training process. At step 201, the corpus of videos, such as lecture videos is obtained. At step 202, for each video in the corpus, spoken words are extracted using ASR or, alternatively, from the close caption (CC) information associated with the respective video. At step 203, slides are detected in video frames of each corpus video using techniques well known to persons of ordinary skill in the art. At step 204, for each detected slide, words appearing in the slide are extracted using, for example, the aforesaid OCR techniques. In an alternative embodiment, the slide text may be extracted directly from the corresponding presentation files containing the slides, if such file is available. At step 205, the extracted spoken words and slide text are used to create a latent variable model for co-occurrence of words in slides and spoken words in accordance with techniques described above. Finally, at step 206, the generated latent variable model is stored, for example, in a matrix form.

1.3 Ranking Score

The result of training is a generative model for the slide and spoken word occurrences within the corpus. This consists of three components that are used for retrieval. The model provides distributions for terms in each modality conditioned on a topic: $p_{sl}(w \mid z)$ and $p_{sp}(w \mid z)^2$. The third component of the model is the video specific topic distribution, $$p(z \mid (T_{sl}, T_{sp})) = \sum_{w_{sl} \in T_{sl}} \sum_{w_{sp} \in T_{sp}} \alpha((w_{sp}, w_{sl}), (T_{sp}, T_{sl})) p(z \mid w_{sp}, w_{sl}), \quad (6)$$

which is computed from the complete likelihood in the formula (3). Again, $\alpha$ is a factor that represents the association between the specific terms ($w_{sl}$, $w_{sp}$) and the video as represented by ($T_{sl}$, $T_{sp}$). This is simply the frequency of the term pair in the combined video transcripts.

A final difficulty in applying this model directly is that the described model generates spoken words from slide words or vice-versa by design. Unfortunately, the user's language model will not directly correspond to either of these models. The ranking score combines the two quantities:

$$p^{sl}(T_q \mid (T_{sl}, T_{sp})) = \prod_{w_q \in T_q} \sum_z p_{sl}(w_q \mid z) \quad (7)$$

$$\sum_{(w_{sl}, w_{sp}) \in (T_{sl}, T_{sp})} \alpha((w_{sp}, w_{sl}), (T_{sp}, T_{sl})) p(z \mid w_{sp}, w_{sl})$$

$$p^{sp}(T_q \mid (T_{sl}, T_{sp})) = \prod_{w_q \in T_q} \sum_z p_{sp}(w_q \mid z) \quad (8)$$

$$\sum_{(w_{sl}, w_{sp}) \in (T_{sl}, T_{sp})} \alpha((w_{sp}, w_{sl}), (T_{sp}, T_{sl})) p(z \mid w_{sp}, w_{sl}).$$

to estimate the final score for ranking the videos given the query $T_q$:

$$\hat{p}(T_q \mid (T_{sl}, T_{sp})) = p^{sl}(T_q \mid (T_{sl}, T_{sp})) p^{sp}(T_q \mid (T_{sl}, T_{sp}))$$

A notable implementation detail is that the summations over the words $w_{sp}$ and $w_{sl}$ in formulas (7) and (8) can be evaluated once per video as represented by $(T_{sl}, T_{sp})$ and stored for later reference at query time. These are the conditional per-video latent variable distributions. Their contributions to (9) are query independent.

Figure 3:
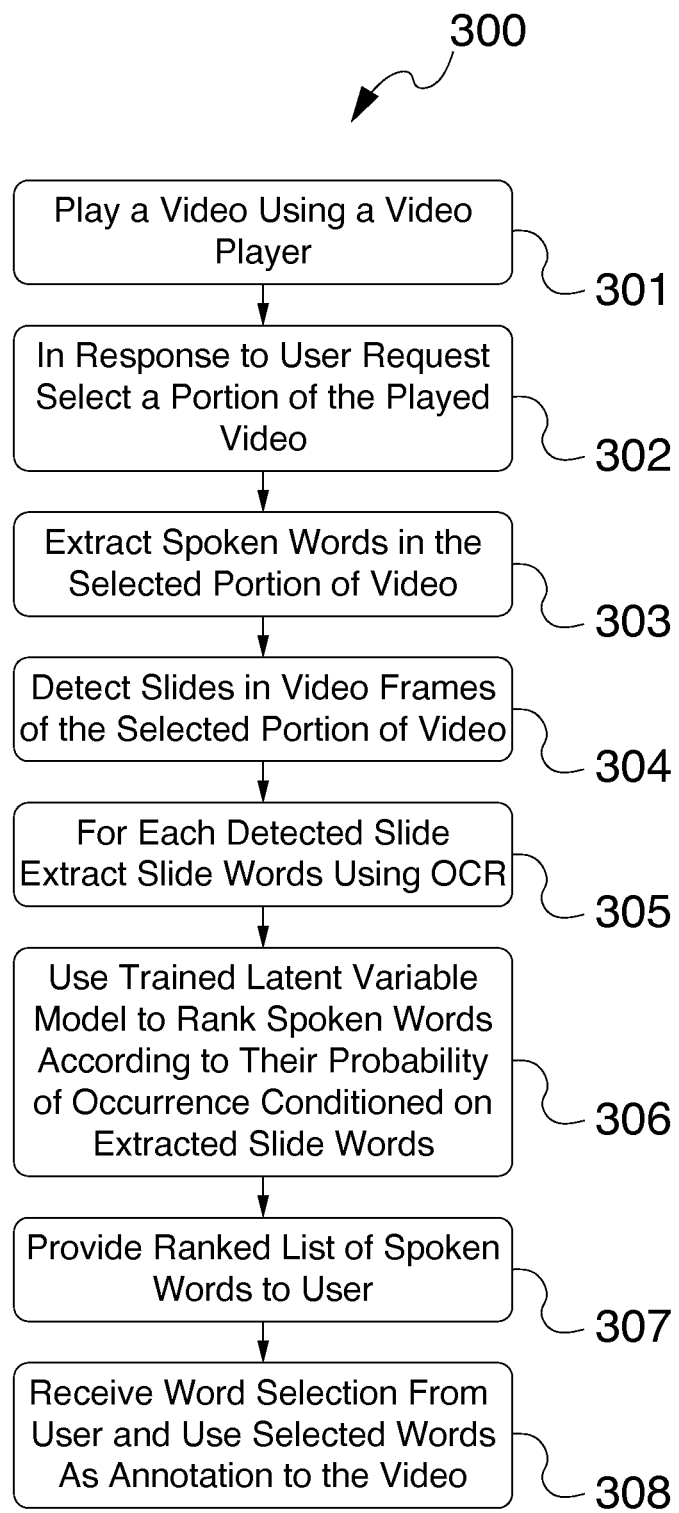
FIG. 3 illustrates an exemplary embodiment of an operating sequence of the method for using slide text to identify the most relevant spoken words and to suppress mis-recognized words or other irrelevant terms.

FIG. 3 illustrates an exemplary embodiment of an operating sequence 300 of the method for using slide text to identify the most relevant spoken words and to suppress mis-recognized words or other irrelevant terms. At step 301, the a video is played to the user using, for example, a video playback application installed on a mobile computing device. At step 302, in response to user's request, the video is paused and a portion of the played video is selected. In one embodiment, the selected portion of the video is a temporal video segment associated with the current time point when the video was paused. In one or more embodiments, the selected portion of the video may include one video frame or multiple video frames together with the associated audio track. In various embodiments, the selected portion of the video may correspond to a contextually meaningful temporal segment of the video, such as a video segment wherein a specific presentation slide is shown and/or discussed. In various embodiments, the contextually meaningful temporal segment of the video may correspond to a single slide, a presentation chapter, topic, section or the entire presentation. At step 303, the spoken words are extracted from the selected portion of the video using, for example, the ASR techniques described above. In another embodiment, the spoken words may be extracted using the aforesaid CC information. At step 304, slides are detected in video frames of the selected portion of the video. At step 305, slide text is extracted from the detected slides using, for example, OCR techniques. In an alternative embodiment, the slide text may be extracted directly from the corresponding presentation file containing the slides, if such file is available.

At step 306, the pre-trained latent variable model is used to rank the extracted spoken words (or sentences) according to their probability of occurrence in the selected video portion conditioned on the detected slide text. At step 307, the ranked list of words, phrases, or sentences is provided to the user. At step 308, user's selection of the items from the ranked list is received and used as annotations to the video or specific point in the video obviating the need for typing such annotations, which is commonly difficult on mobile devices. The goal is to use the slide text to identify key spoken words and suppress mis-recognized words or other irrelevant terms. It should be noted that the key difference from training algorithm shown in FIG. 2 is that only localized text associated with one time point within a single video is processed. On the other hand, during the training, all the text from all the videos is used.

FIG. 4 illustrates an exemplary embodiment of a user interface of an application for generating annotations to a video using the described multi-modal language model. In the shown embodiment of the user interface, the video is played to the user using a user interface window 401. Traditional temporal video navigation tool 402 (slider) is provided to the user to enable temporal video navigation. Additionally provided is a button 403 for adding an annotation to the video.

When the user presses the annotation creation button 403, the application is configured to pause the played video and display to the user an annotation recommendation window 405 containing one or more suggested selections 406 of candidate spoken words for inclusion as annotations to the video. In various embodiments, the term "spoken words" may mean single words (e.g. "constant"), phrases ("Ag prime prime") or even the entire sentences (e.g. "We could factor out that c1 is a constant and we get c1 times Ag prime prime plus Bg prime plus Cg").

The user is able to click on the provided words, phrases or sentences and the user-selected items are automatically associated with the video as annotations. In an alternative embodiment, the candidate words, phrases or sentences 406 may be provided to the user in a form of a ranked list also clickable by the user. The user-selected annotations may be subsequently used for indexing the videos or portions thereof for easy future search and retrieval.

In an alternative embodiment, the top-ranked words, phrases or sentences (e.g. having a rank exceeding a predetermined threshold) identified using the aforesaid method may be automatically selected for video indexing without the need for the user to perform manual selections of annotations.

2. Experiments 2.1 Data Set

A corpus was assembled for controlled experiments, which builds on the data used in the aforesaid published work by Cooper. Specifically, by crawling the conference web sites, 209 lecture videos were accumulated, which included:

1. videos;
2. slides from PPT, PDF, HTML5;
3. closed caption transcripts;
4. ASR transcripts; and
5. OCR extracted slide text.

Using the descriptions of the talks from the web page on which they are hosted, technical terms were first extracted and filtered to remove qualitatively less descriptive queries as described, for example, in Jason Chuang, Christopher D. Manning, and Jeffrey Heer, Without the clutter of unimportant words: Descriptive keyphrases for text visualization, ACM Trans, Comput.-Hum. Interact., 19(3):19:1-19:29, October 2012. Manual ground truth relevance judgments were then compiled for all 275 remaining queries across all 209 videos. The mean average precision was used as an evaluation metric throughout, as described, for example, in published work by Christopher D. Manning, Prabhakar Raghavan, and Hinrich Schutze, Introduction to information retrieval, Cambridge University Press Cambridge, 2008.

2.2 Improving Spoken Document Retrieval Using Slide Text

The first experiment compares using a state of the art full text search system Lucene, well known to persons of ordinary skill in the art, with the ASR transcripts for video retrieval. The performance appears in Table 1 in the VSM column. The described model was deployed in a one-sided fashion to rank videos according to the probability of generating spoken text given the joint model for the videos' slide and spoken text. First, a 200 latent variable model was trained using the ASR and OCR text from the entire video corpus. Specifically, co-occurrence between ASR terms and OCR terms was tabulated over the whole video (global co-occurrence). This was followed by the EM iteration in Section 1.2, where the ASR transcripts for the spoken text and the OCR text obtained from the slides were used. Subsequently, the aforesaid formula (7) was used as the video ranking criterion for each query.

Table 1 includes two versions of the results. In the center column, each video is represented by the automatically extracted ACR and OCR text ($T_{ASR}$, $T_{OCR}$), which is consistent with the learned model. Using the automatically extracted slide text in this manner shows an improvement over the ASR baseline suggesting that the slides help to emphasize spoken terms that better describe the videos. Also, the same model (trained with noisy text) was used but each video was represented by the ground truth slide and spoken text ($T_{PPT}$, $T_{CC}$). The rightmost column shows these results, which demonstrate additional improvements. This demonstrates that as the quality of extracted text improves, the embodiment of the model described herein is able in turn to improve retrieval performance.

TABLE 1

Results for spoken document retrieval using Lucene to index
the ASR transcripts directly (VSM) and multi-modal language
modeling (center and right column) using the corpus. The ranking
for our approach corresponds to the formula in (7).

|  | VSM | $p^{sp}(T_q \mid T_{OCR}, T_{ASR})$ | $p^{sp}(T_q \mid T_{PPT}, T_{CC})$ |
|---|---|---|---|
| map@5 | 0.633 | 0.691 | 0.737 |
| map@10 | 0.613 | 0.684 | 0.718 |
| map@209 | 0.556 | 0.629 | 0.683 |

2.3 Multi-Modal Video Retrieval

Also performed were multi-modal retrieval experiments using the same corpus of 209 videos and set of 275 queries. Again, Lucene represents the baseline and we evaluate it here in unimodal and multi-modal configurations. In the multi-modal case, both early and late fusion strategies were considered. For early fusion, the available slide and spoken text is concatenated to represent each video prior to indexing. For late fusion, cross validation was used to optimize a convex weighting for combining the slide and spoken retrieval scores from the two unimodal indexes.

TABLE 2

Results for lecture video retrieval using Lucene to
index the closed caption (CC) and slide file (PPT)
transcripts directly (VSM) and multi-modal modeling
(right columns) using the 2010-2012 Google I/O corpus.

| | VSM | | VSM/FUSION | | multi-modal (CC, PFT) | |
|---|---|---|---|---|---|---|
| | CC | PPT | early | late | ($T_{ASR}$, $T_{OCR}$) | ($T_{CC}$, $T_{PPT}$) |
| map@5 | 0.839 | 0.785 | 0.863 | 0.869 | 0.802 | 0.902 |
| map@10 | 0.807 | 0.755 | 0.829 | 0.845 | 0.787 | 0.875 |
| map@209 | 0.759 | 0.695 | 0.777 | 0.79 | 0.735 | 0.83 |

For experiments with the described ranking scheme, the formula of (9) was used to rank videos for each text query $T_q$. As a proof of concept, a 200 latent variable model was trained using the manual text transcripts, CC and PPT, for the spoken and slide text. Table 2 shows the results for the baseline systems using the same CC and PPT text. The right columns show two sets of results for our system. The column denoted ($T_{ASR}$, $T_{OCR}$) shows the results of using the described ranking when representing each video by noisy text from the automatic transcripts, ASR and OCR. These results show poor performance relative to the multi-modal VSM/FUSION baselines. The mismatch between the video representations at training and test time clearly degrades the model's retrieval performance. The column denoted ($T_{CC}$, $T_{PPT}$) shows the results of using the described ranking when representing each video by text from the manual transcripts, CC and PPT. In this case, the described approach outperforms the VSM/FUSION baselines.

These experiments were repeated using a 200 latent variable model trained using the automatically extracted text from ASR and OCR to represent each video. The results appear in Table 3. In this case, the late fusion of the automatic unimodal rankings performs at approximately the same level as the described multi-modal approach using the automatic text to represent the videos ($T_{ASR}$, $T_{OCR}$). When the manual text transcripts were used to represent the videos, the results show marked improvements. The results suggest that the described model, even when trained on noisy text data, performs better with higher quality text transcripts at test time.

Table 4 further illustrates the relationship between the described model's performance and the accuracy of the automatic transcripts. The results here focus on the set of 74 videos from the 2011 Google I/O conference. For these videos, the ASR/VSM retrieval performance using Lucene is substantially higher (map@5 of 0.687) compared to the result for the combined years 2010-2012 (map@5 of 0.633), suggesting higher quality ASR transcripts. The OCR/VSM results are also better for 2011, though the margin of improvement is smaller (0.805 for 2011 and 0.777 for 2010-2012). In turn, we see the results of applying our model in training and test time using automatically extracted text from ASR and OCR shows improvements over all the VSM baselines.

The conclusion from these experiments is that the described model does no worse than any of the baselines when trained and tested with poor quality automatic text transcripts. In cases when the quality is somewhat better, one can in turn anticipate the described model's added value for retrieval will be greater.

TABLE 3

Results for lecture video retrieval using Lucene to
index the ASR and OCR transcripts directly (VSM)
and multi-modal modeling (right column) using the
2010-2012 Google I/O corpus. The ranking for
our approach corresponds to the formula in (9).

| | VSM | | VSM/FUSION | | multi-modal (ASR, OCR) | |
|---|---|---|---|---|---|---|
| | ASR | OCR | early | late | ($T_{ASR}$, $T_{OCR}$) | ($T_{CC}$, $T_{PPT}$) |
| map@5 | 0.633 | 0.777 | 0.807 | 0.829 | 0.822 | 0.859 |
| map@10 | 0.613 | 0.76 | 0.78 | 0.811 | 0.805 | 0.833 |
| map@209 | 0.556 | 0.687 | 0.723 | 0.747 | 0.734 | 0.788 |

TABLE 4

Results for lecture video retrieval using Lucene to index the ASR and OCR transcripts directly (VSM) and multi-modal modeling (right column) using the 2011 Google I/O corpus. The ranking for our approach corresponds to the formula in (9).

|  | VSM | | VSM/FUSION | | multi-modal |
|---|---|---|---|---|---|
|  | ASR | OCR | early | late | $(T_{ASR}, T_{OCR})$ |
| map@5 | 0.687 | 0.805 | 0.811 | 0.845 | 0.874 |
| map@10 | 0.675 | 0.794 | 0.800 | 0.837 | 0.86 |
| map@209 | 0.658 | 0.777 | 0.791 | 0.82 | 0.849 |

3. Exemplary Embodiments of System Hardware

Figure 5:
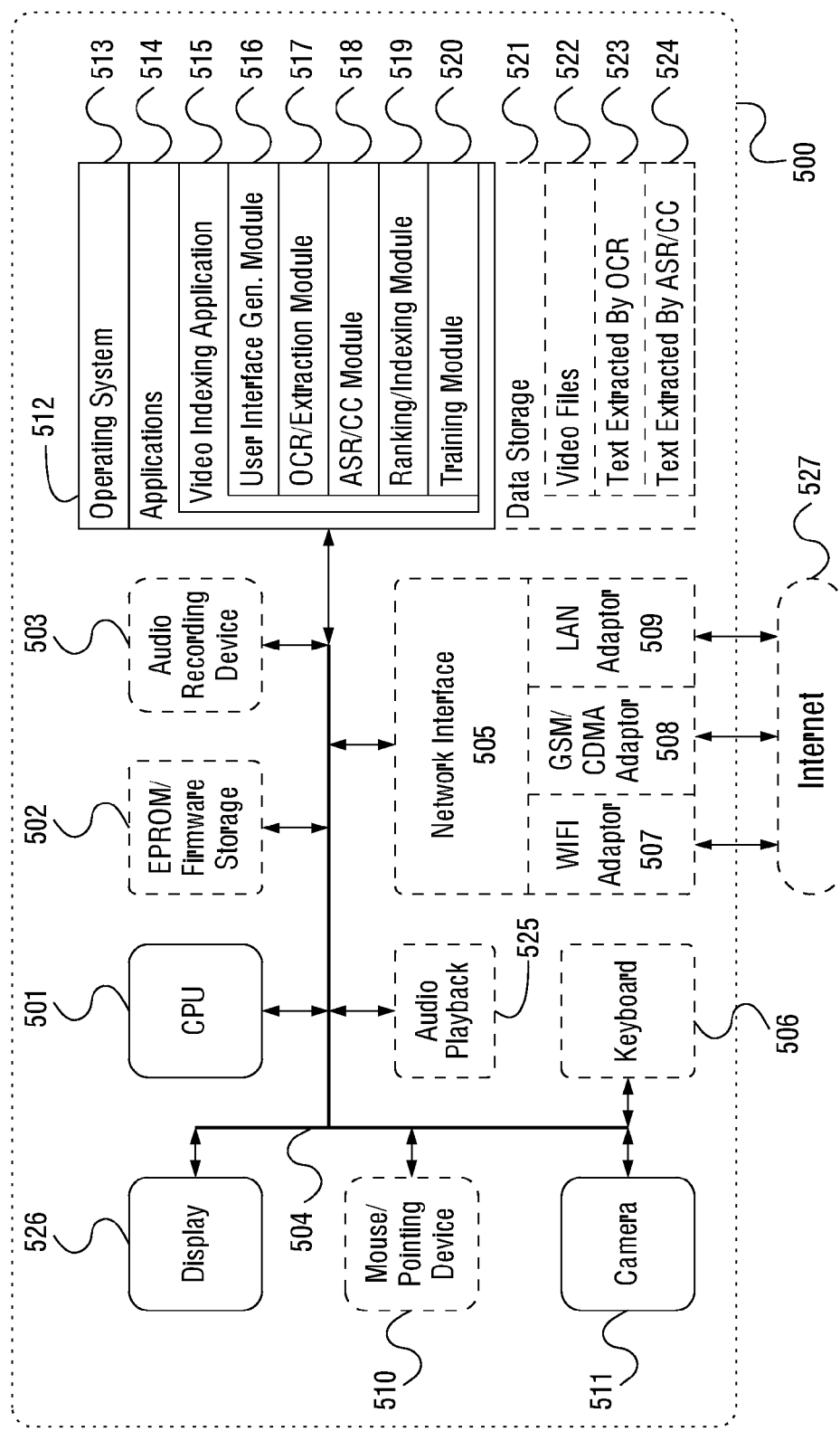
FIG. 5 illustrates an exemplary embodiment of a computerized system on which the various embodiments described herein may be deployed.

FIG. 5 illustrates an exemplary embodiment of a computerized system 500 for integrating text derived from the speech in the audio track and the slides in the video frames for enhanced multi-modal lecture video indexing. In one or more embodiments, the computerized system 500 may be implemented within the form factor of a server computer system or a desktop computer well known to persons of skill in the art. In an alternative embodiment, the computerized system 500 may be implemented based on a laptop or a notebook computer or a mobile computing device, such as a smartphone or a tablet computer.

The computerized system 500 may include a data bus 504 or other interconnect or communication mechanism for communicating information across and among various hardware components of the computerized system 500, and a central processing unit (CPU or simply processor) 501 electrically coupled with the data bus 504 for processing information and performing other computational and control tasks. Computerized system 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, computerized system 500 may further include a read only memory (ROM or EPROM) 502 or other static storage device coupled to the data bus 504 for storing static information and instructions for the processor 501, such as firmware necessary for the operation of the computerized system 500, basic input-output system (BIOS), as well as various configuration parameters of the computerized system 500.

In one or more embodiments, the computerized system 500 may incorporate a display device 526, which may be also electrically coupled to the data bus 504, for displaying various information to a user of the computerized system 500, such as a user interface, an embodiment of which is shown in FIG. 4. In an alternative embodiment, the display device 526 may be associated with a graphics controller and/or graphics processor (not shown). The display device 526 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 526 may be incorporated into the same general enclosure with the remaining components of the computerized system 500. In an alternative embodiment, the display device 526 may be positioned outside of such enclosure, such as on the surface of a table or a desk. In one or more embodiments, the computerized system 500 may further incorporate a projector or mini-projector (not shown) configured to project information, such as the aforesaid user interface(s), onto a display surface.

In one or more embodiments, the computerized system 500 may further incorporate an audio playback device 525 electrically connected to the data bus 504 and configured to play various audio files, such as MPEG-3 files, or audio tracks of various video files, such as MPEG-4 files, well known to persons of ordinary skill in the art. To this end, the computerized system 500 may also incorporate waive or sound processor or a similar device (not shown).

In one or more embodiments, the computerized system 500 may incorporate one or more input devices, such as a mouse/pointing device 510, such as a mouse, a trackball, a touchpad, or cursor direction keys for communicating direction information and command selections to the processor 501 and for controlling cursor movement on the display 526. This input device typically has two degrees of freedom in two axes, a first axis (e.g., x) and a second axis (e.g., y), that allows the device to specify positions in a plane.

The computerized system 500 may further incorporate a camera 511 for acquiring still images and video of various objects, including the video of the presentations, as well as a keyboard 506, which all may be coupled to the data bus 504 for communicating information, including, without limitation, images and video, as well as user commands (including gestures) to the processor 501.

In one or more embodiments, the computerized system 500 may additionally include a communication interface, such as a network interface 505 coupled to the data bus 504. The network interface 505 may be configured to establish a connection between the computerized system 500 and the Internet 527 using at least one of a WIFI interface 507, a cellular network (GSM or CDMA) adaptor 508 and/or local area network (LAN) adaptor 509. The network interface 505 may be configured to enable a two-way data communication between the computerized system 500 and the Internet 527. The WIFI adaptor 507 may operate in compliance with 802.11a, 802.11b, 802.11g and/or 802.11n protocols as well as Bluetooth protocol well known to persons of ordinary skill in the art. The LAN adaptor 509 of the computerized system 500 may be implemented, for example, using an integrated services digital network (ISDN) card or a modem to provide a data communication connection to a corresponding type of telephone line, which is interfaced with the Internet 527 using Internet service provider's hardware (not shown). As another example, the LAN adaptor 509 may be a local area network interface card (LAN NIC) to provide a data communication connection to a compatible LAN and the Internet 527. In an exemplary implementation, the WIFI adaptor 507, the cellular network (GSM or CDMA) adaptor 508 and/or the LAN adaptor 509 send and receive electrical or electromagnetic signals that carry digital data streams representing various types of information.

In one or more embodiments, the Internet 527 typically provides data communication through one or more sub-networks to other network resources. Thus, the computerized system 500 is capable of accessing a variety of network resources located anywhere on the Internet 527, such as remote media servers, web servers, other content servers as well as other network data storage resources. In one or more embodiments, the computerized system 500 is configured to send and receive messages, media and other data, including video files and application program code, through a variety of network(s) including the Internet 527 by means of the network interface 505. In the Internet example, when the computerized system 500 acts as a network client, it may request code or data for an application program executing on the computerized system 500. Similarly, it may, as a server, send various data or computer code to other network resources.

In one or more embodiments, the functionality described herein is implemented by computerized system 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 501 for execution. For example, the instructions may initially be carried on a magnetic disk from a remote computer. Alternatively, a remote computer can load the instructions into its dynamic memory and send the instructions over the Internet 527. Specifically, the computer instructions may be downloaded into the memory 512 of the computerized system 500 from the foresaid remote computer via the Internet 527 using a variety of network data communication protocols well known in the art.

In one or more embodiments, the memory 512 of the computerized system 500 may store any of the following software programs, applications or modules:

1. Operating system (OS) 513 for implementing basic system services and managing various hardware components of the computerized system 500. Exemplary embodiments of the operating system 513 are well known to persons of skill in the art, and may include any now known or later developed operating systems.

2. Applications 514 may include, for example, a set of software applications executed by the processor 501 of the computerized system 500, which cause the computerized system 500 to perform certain predetermined functions, such as display user interface(s) on the display device 526 or perform indexing of video files using the spoken words extracted from the videos and slide text. In one or more embodiments, the applications 514 may include an inventive video indexing application 515, described in detail below.

3. Data storage 521 may include, for example, a video file storage 522 for storing various video files, including video files of presentations as well as a storage 523 for storing text extracted from presentation slides using, for example, OCR techniques. Alternatively, the storage 523 pay store text extracted from the presentation slides themselves. In addition, the data storage 521 may include a storage 524 for storing text extracted from audio track of the video files using, for example, ASR techniques. Alternatively, this text may be extracted from the close caption information accompanying the respective video media.

In one or more embodiments, the inventive video indexing application 515 incorporates a user interface generation module 516 configured to generate a user interface shown, for example, in FIG. 4 using the display 526 of the computerized system 500. The inventive video indexing application 515 may further include OCR/Extraction module 517 for extracting text from the slides shown in the presentation video or from the slides themselves. The inventive video indexing application 515 may further include an ASR module 518 for obtaining spoken words using automatic speech recognition applied to the audio track of the video files. Alternatively, the module 518 may be configured to extract the spoken words using the close captioning information associated with the video files. Additionally provided may be a ranking/indexing module 519 for performing ranking operation of detected spoken words based on the extracted slide text and the indexing operation on video files in accordance with the techniques described above. Finally, there may be provided a training module 520 for performing training of the latent variable model configured to operate in accordance with the techniques described above.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for multi-modal video indexing. It is intended that the specification and examples be considered as exemplary only, with a true scope and spirit of the invention being indicated by the following claims.

What is claimed is:

1. A computer-implemented method performed in connection with a computerized system comprising a processing unit and a memory, the computer-implemented method comprising:
   a. using the processing unit to generate a multi-modal language model for co-occurrence of spoken words in the plurality of videos and an external text associated with the plurality of videos;

b. selecting at least a portion of a first video;

c. extracting a plurality of spoken words from the selected portion of the first video;

d. obtaining a first external text associated with the selected portion of the first video, wherein the obtained first external text is separate and distinct from a representation of the extracted plurality of spoken words; and e. using the processing unit and the generated multi-modal language model to rank the extracted plurality of spoken words based on probability of occurrence conditioned on the obtained first external text.

2. The computer-implemented method of claim 1, wherein the obtaining the first external text comprises extracting the first external text from a text displayed in the selected portion of the first video.

3. The computer-implemented method of claim 1, wherein the external text is displayed in at least one of the plurality of videos.

4. The computer-implemented method of claim 1, wherein the external text is contained in a content associated with at least one of the plurality of videos.

5. The computer-implemented method of claim 1, wherein each of the plurality of videos comprises a plurality of presentation slides comprising the external text.

6. The computer-implemented method of claim 1, wherein generating the multi-modal language model comprises extracting all spoken words from all of the plurality of videos and extracting the external text displayed in the plurality of videos and calculating a plurality of probabilities of co-occurrence of each of the extracted spoken words and each of the extracted external text.

7. The computer-implemented method of claim 1, wherein the multi-modal language model is stored in a matrix form.

8. The computer-implemented method of 1, wherein the plurality of spoken words is extracted from the selected portion of the first video using automated speech recognition (ASR).

9. The computer-implemented method of 1, wherein the plurality of spoken words are extracted from the selected portion of the first video using close captioning (CC) information associated with the first video.

10. The computer-implemented method of 1, wherein obtaining the first external text associated with the selected portion of the first video comprises detecting slides in the selected portion of the first video and extracting the first external text from the detected slides using optical character recognition (OCR).

11. The computer-implemented method of claim 1, further comprising providing the ranked plurality of spoken words to the user; receiving from the user a selection of at least one of the provided plurality of spoken words; and using the received selection of the at least one of the provided plurality of spoken words as an annotation for the first video.

12. The computer-implemented method of claim 11, further comprising using the annotation to index at least some of the plurality of videos.

13. The computer-implemented method of claim 1, further comprising using the ranked extracted plurality of spoken words to index at least some of the plurality of videos.

14. The computer-implemented method of claim 1, further comprising using top ranked words from the ranked extracted plurality of spoken words to index at least some of the plurality of videos.

15. The computer-implemented method of 1, wherein the extracted plurality of spoken words comprise a phrase.

16. The computer-implemented method of 1, wherein the extracted plurality of spoken words comprise a sentence.

17. The computer-implemented method of 1, wherein the selected portion of the first video comprises a contextually meaningful segment of the first video.

18. A non-transitory computer-readable medium embodying a set of computer-executable instructions, which, when executed in connection with a computerized system comprising a processing unit and a memory, cause the computerized system to perform a method comprising:

a. using the processing unit to generate a multi-modal language model for co-occurrence of spoken words in the plurality of videos and an external text associated with the plurality of videos;

b. selecting at least a portion of a first video;

c. extracting a plurality of spoken words from the selected portion of the first video;

d. obtaining a first external text associated with the selected portion of the first video, wherein the obtained first external text is separate and distinct from a representation of the extracted plurality of spoken words; and e. using the processing unit and the generated multi-modal language model to rank the extracted plurality of spoken words based on probability of occurrence conditioned on the obtained first external text.

19. A computerized system comprising a processing unit and a memory storing a set of instructions, the set of instructions comprising instructions for:

a. using the processing unit to generate a multi-modal language model for co-occurrence of spoken words in the plurality of videos and an external text associated with the plurality of videos;

b. selecting at least a portion of a first video;

c. extracting a plurality of spoken words from the selected portion of the first video;

d. obtaining a first external text associated with the selected portion of the first video, wherein the obtained first external text is separate and distinct from a representation of the extracted plurality of spoken words; and e. using the processing unit and the generated multi-modal language model to rank the extracted plurality of spoken words based on probability of occurrence conditioned on the obtained first external text.

* * * * *